US012759206B2

(12) United States Patent
Josefsson et al.

(10) Patent No.: US 12,759,206 B2
(45) Date of Patent: Oct. 13, 2026

(54) METHOD AND ARRANGEMENT FOR FORMING GROOVES IN A BOARD ELEMENT

(71) Applicant: Ceraloc Innovation AB, Viken (SE)

(72) Inventors: Per Josefsson, Ramlösa (SE); Martin Bjeremyr, Helsingborg (SE); Richard Jolfson, Jonstorp (SE)

(73) Assignee: CERALOC INNOVATION AB, Viken (SE)

( * ) Notice: Subject to any disclaimer, the term of this patent is extended or adjusted under 35 U.S.C. 154(b) by 506 days.

(21) Appl. No.: 17/463,902

(22) Filed: Sep. 1, 2021

(65) Prior Publication Data

US 2022/0063167 A1 Mar. 3, 2022

(30) Foreign Application Priority Data

Sep. 2, 2020 (SE) .................................... 2051036-8

(51) Int. Cl.
*B29C 48/00* (2019.01)
*B29K 101/12* (2006.01)
*B29K 509/00* (2006.01)

(52) U.S. Cl.
CPC .. *B29C 48/0022* (2019.02); *B29C 2793/0054* (2013.01); *B29C 2793/009* (2013.01); *B29K 2101/12* (2013.01); *B29K 2509/00* (2013.01)

(58) Field of Classification Search
CPC . B29C 48/07; B29C 48/002; B29C 2793/009; B29C 2793/0054
See application file for complete search history.

(56) References Cited

U.S. PATENT DOCUMENTS 3,141,913 A * 7/1964 Edwards ............... B29C 48/001 264/296
3,220,595 A * 11/1965 Edwards ................ B32B 27/00 428/116
3,574,809 A * 4/1971 Fairbanks et al. ...... B29C 59/04 264/209.3
3,975,974 A * 8/1976 Harris .................... B26D 3/003 83/342
4,016,320 A * 4/1977 Harris .................... B26D 3/003 428/131
4,058,942 A * 11/1977 Naka ..................... E04F 11/163 428/167

(Continued)

FOREIGN PATENT DOCUMENTS

CN 101134654 A 3/2008
CN 101852004 A 10/2010

(Continued)

OTHER PUBLICATIONS

English Translation for Pervan (WO 2014007738) (Year: 2015).*

(Continued)

*Primary Examiner* — Seyed Masoud Malekzadeh
(74) *Attorney, Agent, or Firm* — Boone IP Law

(57) ABSTRACT

A method for forming at least one groove in a board element, wherein the board element includes a polymer-based material and, preferably, a filler. The method includes providing a board element including a board portion disposed at an elevated temperature and forming at least one groove by removing material, such as chips, from the board portion by a processing device.

13 Claims, 10 Drawing Sheets

(56) References Cited

U.S. PATENT DOCUMENTS

| | | | | |
|---|---|---|---|---|
| 4,060,947 | A * | 12/1977 | Naka | E04F 11/166 52/179 |
| 4,128,369 | A * | 12/1978 | Kemerer | B29C 48/001 425/371 |
| 5,094,058 | A * | 3/1992 | Slocum | E04D 1/265 264/173.1 |
| 6,096,975 | A * | 8/2000 | Streit | F16L 3/26 174/72 A |
| 8,245,477 | B2 | 8/2012 | Pervan | |
| 8,381,488 | B2 | 2/2013 | Pervan | |
| 8,544,232 | B2 | 10/2013 | Wybo et al. | |
| 8,720,151 | B2 | 5/2014 | Pervan | |
| 8,850,769 | B2 | 10/2014 | Pervan | |
| 8,875,464 | B2 | 11/2014 | Pervan et al. | |
| 8,935,899 | B2 | 1/2015 | Bergelin et al. | |
| 9,140,010 | B2 | 9/2015 | Pervan | |
| 9,194,135 | B2 | 11/2015 | Pervan | |
| 9,314,936 | B2 | 4/2016 | Pervan | |
| 9,482,015 | B2 | 11/2016 | Pervan | |
| 9,556,623 | B2 | 1/2017 | Pervan | |
| 9,663,956 | B2 | 5/2017 | Pervan | |
| 9,714,515 | B2 | 7/2017 | Pervan | |
| 9,758,966 | B2 | 9/2017 | Bergelin et al. | |
| 9,758,972 | B2 | 9/2017 | Pervan | |
| 9,840,849 | B2 | 12/2017 | Pervan | |
| 10,066,400 | B2 | 9/2018 | Pervan | |
| 10,189,300 | B2 | 1/2019 | Hannig | |
| 10,207,443 | B2 * | 2/2019 | Krohmer | B29C 48/002 |
| 10,619,356 | B2 | 4/2020 | Pervan | |
| 10,669,724 | B2 | 6/2020 | Pervan | |
| 11,002,022 | B2 | 5/2021 | Pervan | |
| 11,141,897 | B2 * | 10/2021 | Hirokawa | B29C 48/21 |
| 11,413,796 | B2 * | 8/2022 | Pucci | B29C 66/53461 |
| 11,679,534 | B2 * | 6/2023 | Pucci | B65D 85/8043 264/232 |
| 11,712,816 | B2 * | 8/2023 | Josefsson | B27F 1/02 144/371 |
| 2002/0182473 | A1 * | 12/2002 | Blunk | B29C 45/0013 429/432 |
| 2003/0233809 | A1 | 12/2003 | Pervan | |
| 2005/0087895 | A1 * | 4/2005 | Franko | B29C 43/222 264/1.6 |
| 2005/0208255 | A1 | 9/2005 | Pervan | |
| 2005/0263244 | A1 * | 12/2005 | Henderson | B29C 66/4722 156/304.6 |
| 2007/0169884 | A1 * | 7/2007 | Henderson | B29C 66/8242 156/309.6 |
| 2008/0008871 | A1 | 1/2008 | Pervan | |
| 2011/0247285 | A1 | 10/2011 | Wybo | |
| 2011/0277409 | A1 * | 11/2011 | Atkinson | E04F 13/105 52/387 |
| 2013/0047536 | A1 | 2/2013 | Pervan | |
| 2013/0065072 | A1 | 3/2013 | Pervan et al. | |
| 2013/0145707 | A1 | 6/2013 | Pervan | |
| 2013/0199120 | A1 | 8/2013 | Bergelin et al. | |
| 2013/0283720 | A1 | 10/2013 | Pervan et al. | |
| 2014/0000197 | A1 | 1/2014 | Pervan | |
| 2014/0020820 | A1 | 1/2014 | Meersseman et al. | |
| 2014/0215952 | A1 | 8/2014 | Pervan | |
| 2014/0322379 | A1 * | 10/2014 | Hsu | B29C 48/0022 425/380 |
| 2015/0059927 | A1 | 3/2015 | Brännström et al. | |
| 2015/0090400 | A1 | 4/2015 | Bergelin et al. | |
| 2015/0345153 | A1 | 12/2015 | Pervan | |
| 2016/0023393 | A1 * | 1/2016 | Slama | B29C 48/914 264/154 |
| 2016/0194883 | A1 | 7/2016 | Pervan | |
| 2016/0201336 | A1 * | 7/2016 | Pervan | B26D 3/065 52/582.2 |
| 2016/0208501 | A1 | 7/2016 | Pervan | |
| 2016/0265234 | A1 | 9/2016 | Pervan | |
| 2016/0265236 | A1 | 9/2016 | Pervan | |
| 2017/0001358 | A1 * | 1/2017 | Krohmer | B29C 48/002 |
| 2017/0114550 | A1 | 4/2017 | Pervan | |
| 2017/0268238 | A1 | 9/2017 | Pervan | |
| 2018/0080232 | A1 | 3/2018 | Pervan | |
| 2018/0313094 | A1 | 11/2018 | Pervan | |
| 2020/0208411 | A1 | 7/2020 | Pervan | |
| 2020/0282589 | A1 * | 9/2020 | Josefsson | B27G 21/00 |
| 2020/0308846 | A1 | 10/2020 | Joseffson et al. | |
| 2021/0032877 | A1 | 2/2021 | Pervan | |
| 2021/0198901 | A1 | 7/2021 | Josefsson et al. | |
| 2021/0308915 | A1 * | 10/2021 | Pucci | B29C 43/361 |
| 2021/0363760 | A1 | 11/2021 | Pervan | |

FOREIGN PATENT DOCUMENTS

| | | | | |
|---|---|---|---|---|
| CN | 102555150 | A | 7/2012 | |
| CN | 103146094 | A | 6/2013 | |
| CN | 104277353 | A | 1/2015 | |
| CN | 104411900 | A | 3/2015 | |
| CN | 104592687 | A | 5/2015 | |
| CN | 107880366 | A | 4/2018 | |
| CN | 108560850 | A | 9/2018 | |
| CN | 208500821 | U | 2/2019 | |
| CN | 110181630 | A | 8/2019 | |
| CN | 111946009 | A | 11/2020 | |
| EP | 1587998 | B1 | 3/2010 | |
| EP | 2 395 180 | A2 | 12/2011 | |
| EP | 3 628 506 | A1 | 4/2020 | |
| JP | 2004-114663 | A2 | 4/2004 | |
| KR | 10-0510931 | B1 | 8/2005 | |
| KR | 20110122694 | A | 11/2011 | |
| WO | WO 2004/012918 | A1 | 2/2004 | |
| WO | 2004/063492 | A1 | 7/2004 | |
| WO | WO 2010/072357 | A2 | 1/2014 | |
| WO | WO-2014007738 | A1 * | 1/2014 | E04F 15/107 |
| WO | WO 2015/028390 | A1 | 3/2015 | |
| WO | WO 2019/083895 | A1 | 5/2019 | |
| WO | WO 2020/180237 | A1 | 9/2020 | |
| WO | WO 2021/133242 | A1 | 7/2021 | |
| WO | WO 2021/018918 | A1 | 9/2021 | |

OTHER PUBLICATIONS

International Preliminary Report on Patentability received for PCT Patent Application No. PCT/SE2021/050847, mailed on Mar. 16, 2023, 7 pages.

International Search Report and Written Opinion received for PCT Patent Application No. PCT/SE2021/050847, mailed on Sep. 16, 2021, 13 pages.

U.S. Appl. No. 18/425,012, Jan. 29, 2024, Per Josefsson.

U.S. Appl. No. 17/705,465, filed Mar. 28, 2022, Per Josefsson.

U.S. Appl. No. 17/831,826, filed Jun. 3, 2022, Per Josefsson.

U.S. Appl. No. 18/055,473, filed Nov. 15, 2022, Per Josefsson.

U.S. Appl. No. 18/209,359, filed Jun. 13, 2023, Per Josefsson.

U.S. Appl. No. 18/209,667, filed Jun. 14, 2023, Per Josefsson.

U.S. Appl. No. 18/210,429, filed Jun. 15, 2023, Per Josefsson.

U.S. Appl. No. 18/495,918, filed Oct. 27, 2023, Per Josefsson.

U.S. Appl. No. 18/295,559, filed Apr. 4, 2023, Darko Pervan.

U.S. Appl. No. 17/812,281, filed Jul. 13, 2022, Darko Pervan.

U.S. Appl. No. 18/240,192, filed Aug. 30, 2023, Darko Pervan.

U.S. Appl. No. 16/808,973, filed Mar. 4, 2020, Per Josefsson and Richard Jolfson, (Cited herein as US Patent Application Publication No. 2020/0282589 A1 of Sep. 10, 2020).

U.S. Appl. No. 16/826,761, filed Mar. 23, 2020, Per Josefsson, Pontus Gamstedt and Per Nygren, (Cited herein as US Patent Application Publication No. 2020/0308846 A1 of Oct. 1, 2020).

U.S. Appl. No. 16/854,343, filed Apr. 21, 2020, Darko Pervan, (Cited herein as US Patent Application Publication No. 2021/0032877 A1 of Feb. 4, 2021).

U.S. Appl. No. 17/130,783, filed Dec. 22, 2020, Per Josefsson, Christoffer Nilsson, Filip Sköld, (Cited herein as US Patent Application Publication No. 2021/0198901 of 1 Jul. 1, 2021).

U.S. Appl. No. 17/228,240, filed Apr. 12, 2021, Darko Pervan, (Cited herein as US Patent Application Publication No. 2021/0363760 A1 of Nov. 1, 2021).

U.S. Appl. No. 17/705,465, filed Mar. 28, 2022, Per Josefsson and Christoffer Nilsson.

(56) References Cited

OTHER PUBLICATIONS

U.S. Appl. No. 17/831,826, filed Jun. 3, 2022, Per Josefsson, Pontus Gamstedt and Per Nygren.
Official Action and Search Report issued in Swedish Patent Application No. 2051036-8, Feb. 11, 2021, PRV Swedish Patent and Registration Office, Stockholm, SE, 7 pages.
Josefsson, Per, et al., U.S. Appl. No. 17/705,465 entitled "Method and Assembly for Manufacturing a Board Element Comprising a Recycled Material," filed in the U.S. Patent and Trademark Office Mar. 28, 2022.
Josefsson, Per, et al., U.S. Appl. No. 17/831,826 entitled "Mineral-Based Panel Comprising Grooves and a Method for Forming Grooves," filed in the U.S. Patent and Trademark Office Jun. 3, 2022.
U.S. Appl. No. 18/663,063, filed May 14, 2024, Per Josefsson.
U.S. Appl. No. 18/628,988, Apr. 8, 2024, Per Josefsson.
Extended Search Report dated Sep. 9, 2024, by the European Patent Office in European Application No. EP21864810.3 (7 pages).
U.S. Appl. No. 18/991,969, filed Dec. 23, 2024, Darko Pervan.
Chinese Office Action mailed on Apr. 4, 2025 by the Chinese Patent Office in Application No. CN 202180052516.9 (with English translation) (9 pages).
Ma Shuwen, "Metal Cutting Dynamics", Southwest Jiaotong University Press, Chengdu, pp. 25, 1-13 (with English translation) (6 pages).
U.S. Appl. No. 18/946,258, filed Nov. 13, 2024, Per Josefsson.
U.S. Appl. No. 19/197,432, filed May 2, 2025, Per Josefsson.
U.S. Appl. No. 19/232,036, filed Jun. 9, 2025, Per Josefsson.

* cited by examiner

METHOD AND ARRANGEMENT FOR FORMING GROOVES IN A BOARD ELEMENT

CROSS REFERENCE TO RELATED APPLICATIONS

The present application claims the benefit of Swedish Application No. 2051036-8, filed on Sep. 2, 2021. The entire contents of Swedish Application No. 2051036-8 are hereby incorporated herein by reference in their entirety.

TECHNICAL FIELD

The disclosure generally relates to a method and an arrangement for reducing weight in a board element, such as a panel. More specifically, the disclosure relates to a method and an arrangement for forming at least one groove in a board element. The panel may be a building panel, floor panel, wall panel, ceiling panel or furniture panel.

BACKGROUND

The disclosure WO 2020/180237 A1 discloses improved methods and systems for providing grooves in board elements, such as panels, which for example may provide components for a thermoplastic flooring. In particular, the disclosure describes methods for forming at least one groove in a rear side of a board element by removing material from the board element by a processing tool. The processing tool may be a rotating cutting device or a scraping tool, a carving tool, a drilling tool or a milling tool.

However, there is still room for improvements, in particular when the methods, such as those described above, are implemented in in-line processes.

SUMMARY

It is therefore an object of at least embodiments of the present disclosure to provide a method for forming grooves in a board element that is more controlled.

Another object of at least embodiments of the present disclosure to provide a method for forming grooves that is more energy efficient.

It is also an object of at least embodiments of the present disclosure to provide a corresponding arrangement for forming grooves.

At least some of these and other objects and advantages that will be apparent from the description have been achieved by the various aspects described below.

In accordance with a first aspect of the disclosure, there is provided a method for forming at least one groove in a board element, wherein the board element comprises a polymer-based material and, preferably, a filler. The method comprises providing a board element comprising a board portion disposed at an elevated temperature, and forming the at least one groove by removing material, such as chips, from the board portion by a processing device.

By means of the elevated temperature, the cutting forces for removing material from the board element may be reduced. Thereby, an increased control of the forming of the groove(s) may be provided. This may be advantageous, or in some embodiments even necessary, when a production speed, such as in an inline process, exceeds a certain threshold value.

Additionally, decreased cutting forces may reduce the power consumption of the processing device during forming of the groove(s).

Furthermore, the polymer-based material of the board element may be more easily processed. Also, by means of the decreased cutting forces, an undesired displacement of the board element may be counteracted during forming of the grooves.

The groove(s) may reduce the weight of the board element. In some embodiments, the groove(s) may provide an increased flexibility to the board element or panel.

The processing device, preferably comprising a rotational cutting device, a carving tool or a milling tool, may remove material along at least 5 mm, preferably at least 50 mm, of the board portion. For example, the processing device, preferably comprising a rotational cutting device, a carving tool or a milling tool, may remove material along at least 80% of the length of the board portion or panel, preferably at least 90% of the length of board portion or panel. The processing device, preferably comprising a drilling tool or a milling tool, may remove material in a region of the board portion which is less than 30 mm, preferably less than 10 mm, along one direction.

The method may further comprise elevating a temperature of the board portion from an initial temperature to the elevated temperature. Thereby, the elevated temperature may be higher than the initial temperature.

The elevated temperature may be higher than an ambient temperature in which the board element is provided during the forming of the groove(s) and/or higher than the initial temperature of the board portion. For example, the ambient temperature may be 16-26° C. During certain time periods, however, the ambient temperature may be 13-40° C. Such deviations may occur when the area in which the method is being implemented has no temperature control mechanism, e.g., during summer or winter time. The ambient temperature may be an average temperature over a period of time, such as during a production cycle of the board element.

The initial temperature may be a temperature of the board portion that has been acclimatized to the ambient temperature. Alternatively, or additionally, the initial temperature may be a temperature of the board element before heating of the board element.

The initial temperature may be measured by an infrared thermometer or a thermal imaging camera.

The elevated temperature may be obtained by heating the board portion. The board portion may be heated by a separate board heating device, such as a heating oven, an infrared heating element or heated roller(s).

The elevated temperature may be obtained during forming of the board element under heat and, preferably, pressure. By means of this embodiment, the heat generated for forming the board element may be used for simplifying the forming of groove(s) therein. Indeed, by forming under heat, the temperature of the material provided in the board element may be raised. The board portion, or even the entire board element, may be disposed at a board forming temperature directly after forming. For example, the elevated temperature may be obtained during (co-)extrusion and/or pressing of the board element under heat and pressure. Throughout the disclosure, by (co-)extrusion is meant either extrusion or coextrusion.

The elevated temperature may be predetermined. For example, it may be controlled to assume a value within a predetermined temperature range.

The forming of the groove(s) may performed when the material of the formed board element has been sufficiently stabilized such than little of even no deformation of the board element may be induced as a result of the forming of the groove(s).

The board forming temperature may be 90-150° C., preferably for a board element comprising polyvinyl chloride, PVC. The board forming temperature may be 220-270° C. for a board element comprising polyethylene terephthalate, PET, 170-220° C. for a board element comprising polypropylene, PP, and 160-230° C. for a board element comprising polyurethane, PU.

The groove(s) may be formed after a forming of the board element while the board portion is disposed at the elevated temperature, which in some embodiments may correspond to the board forming temperature.

After the forming of the board element, however, it may, in some embodiments, be partially cooled from the board forming temperature to the elevated temperature, which preferably still is elevated above the ambient temperature.

In fact, in some embodiments, the method may further comprise forming, preferably at least one layer of, the board element under heat, preferably by (co-)extrusion and/or under pressure. Optionally, the at least one layer, or the board element, may be calendered after the (co-)extrusion.

Optionally, the groove(s) may be formed in relation to, such as during, or after trimming of edge portions of the formed board element. The temperature of the board element, and in particular the board portion, may have decreased between the forming of the board element and the trimming.

The board portion may comprise a processable portion from which the material, such as chips, may be removed. The board portion may be provided at least in a rear side of the board element. In some embodiments, the board portion may be the entire board element. Thereby, the temperature, such as the ambient, the initial and/or the elevated temperature, of the entire board element may be substantially uniform. In some embodiments, the board portion may form a partial section of the entire board element, such as being provided in the rear side. Thereby, a temperature of the board portion may be different from a temperature of a remainder of the board element.

The polymer-based material, such as that being provided in the board portion, may comprise a thermoplastic material and, preferably, a filler.

In some embodiments, the polymer-based material, such as that being provided in the board portion, may comprise a thermoset and, optionally, a filler.

The filler in any embodiment above may be an inorganic filler, such as a mineral material, for example calcium carbonate ($CaCO_3$), talc or stone material, such as stone powder. Alternatively, or additionally, the filler may be an organic filler. For example, the filler may comprise fibres, such as wood fibres, or bamboo.

The board element may comprise a layer arrangement comprising at least one layer, such as a single layer, which may include or be a core. Each layer may comprise a polymer-based material and, preferably, a filler.

The board element, such as at least one layer thereof, such as a core, or even all layers thereof, may comprise a polymer-based material, preferably a thermoplastic material, to a degree of 10-60 wt % or 15-50 wt %, a filler to a degree of 30-85 wt % or 45-80 wt %, and, preferably, at least one of a plasticizer, colourants, and additives, such as a stabilizer, a blowing agent, a foaming agent, a lubricant, an impact modifier, and/or a processing aid, to a degree of 0.5-15 wt % or 1-12 wt %.

In any of the embodiments herein, a degree of filler may exceed 40 wt %, preferably exceeding 60 wt %, and/or a degree of plasticizer may be less than 5 wt %, for example, 0.5 wt % to less than 5%, or for example, free of plasticizer. Thereby, the board element, or at least one layer thereof, may become rigid.

The elevated temperature may exceed 25° C., preferably exceeding 40° C. or exceeding 60° C., and, for example, may be from above 25° C. to 280° C., from above 25° C. to 150° C., or from above 25° to the board forming temperature.

The cutting forces may become continuously smaller as a function of a continuously increasing elevated temperature, e.g., up to a certain maximal temperature, which may depend on the type of material. Indeed, the cutting forces may decrease up to a certain maximal temperature of the polymer-based material after which this effect may become negligible or even absent.

The elevated temperature may be 30-150° C., such as 35-90° C. or preferably 40-70° C. This may be preferred for a thermoplastic material, such as PVC. In some embodiments, the elevated temperature may be 30-190° C., such as 35-90° C. or preferably 40-70° C., which may be preferred for a thermoplastic material, such as PE, PET, PU and PP.

The method may further comprise displacing the board element in a feeding direction, preferably during the forming of the groove(s).

The removed material may be collected, preferably by suction and/or blowing, such as by vacuum and/or by an airstream, respectively. The removed material may be collected during a displacement of the board element.

Generally herein, the groove(s) may be formed by a rotational or a non-rotational operation, preferably utilizing a plurality of cutting teeth.

The processing device may comprise a rotational cutting device. The rotating cutting device may comprise at least one cutting element, preferably a plurality of cutting elements.

The processing device may comprise a carving tool. The carving tool may comprise at least one cutting tooth, preferably a plurality of cutting teeth. During carving, the cutting teeth may be disposed after each other along a feeding direction of the board element.

In some embodiments, the processing device may comprise at least two rotational cutting devices. Thereby, the cutting forces may be even further reduced. Each rotating cutting device may comprise at least one cutting element, preferably a plurality of cutting elements. The effect is similar when a plurality of cutting teeth of a carving tool is utilized.

In some embodiments, the processing device may comprise a drilling tool or a milling tool. The drilling tool or milling tool may comprise at least one, preferably a plurality of, cutting element(s).

In some embodiments, the board element may be a panel per se. In some embodiments, however, the board element may be dividable into at least two panels. The method may further comprise dividing the board element into at least two panels, preferably while the board element is provided above the initial temperature and/or the ambient temperature.

Generally herein, the panel per se or any panel into which the board element is divided may be a building panel, floor panel, wall panel, ceiling panel or furniture panel.

The method may further comprise forming a, preferably mechanical, locking device on at least one edge portion of the board element in the form of a panel or of at least two panels into which the board element has been divided, preferably on two opposite edge portions thereof.

In accordance with a second aspect of the disclosure, there is provided an arrangement for forming grooves in a board element. The arrangement comprises a board heating device and a processing device.

Embodiments and examples of the second aspect are largely analogous to those of the first aspect, whereby reference is made thereto. In addition, the following embodiments and examples are included.

The board heating device may be configured to heat the board portion of the board element, preferably before forming the groove(s). In a first example, the board heating device is provided in a board forming arrangement. Thereby, an elevated temperature may be obtained during forming of the board element, cf. the discussion above. In a second example, and as also discussed above, the board heating device is a separate heating device configured to heat the board portion.

Further aspects of the disclosure and embodiments and examples of the first and second aspects are provided in an embodiment section below which includes a list of items (clauses). It is emphasized that the embodiments and examples of both aspects may be combined with each other.

Generally, all terms used in the claims and in the items in the embodiment section below are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The disclosure will in the following be described in connection to exemplary embodiments and in greater detail with reference to the appended exemplary drawings, wherein.

DETAILED DESCRIPTION

In the following various embodiments of an arrangement 10 for forming grooves 3 in a board element will be described with reference to the embodiments in FIGS. 1*a*-1*b*, 2*a*-2*f*, 3*a*-3*e*, 4*a*-4*c*, 5*a*-5*b* and 6*a*-6*f*. The arrangement 10 is capable of implementing embodiments of a method for forming grooves 3 in a board element 1', such as a panel 1. The panel may be a building panel, floor panel, wall panel, ceiling panel or furniture panel.

Figure 1A:
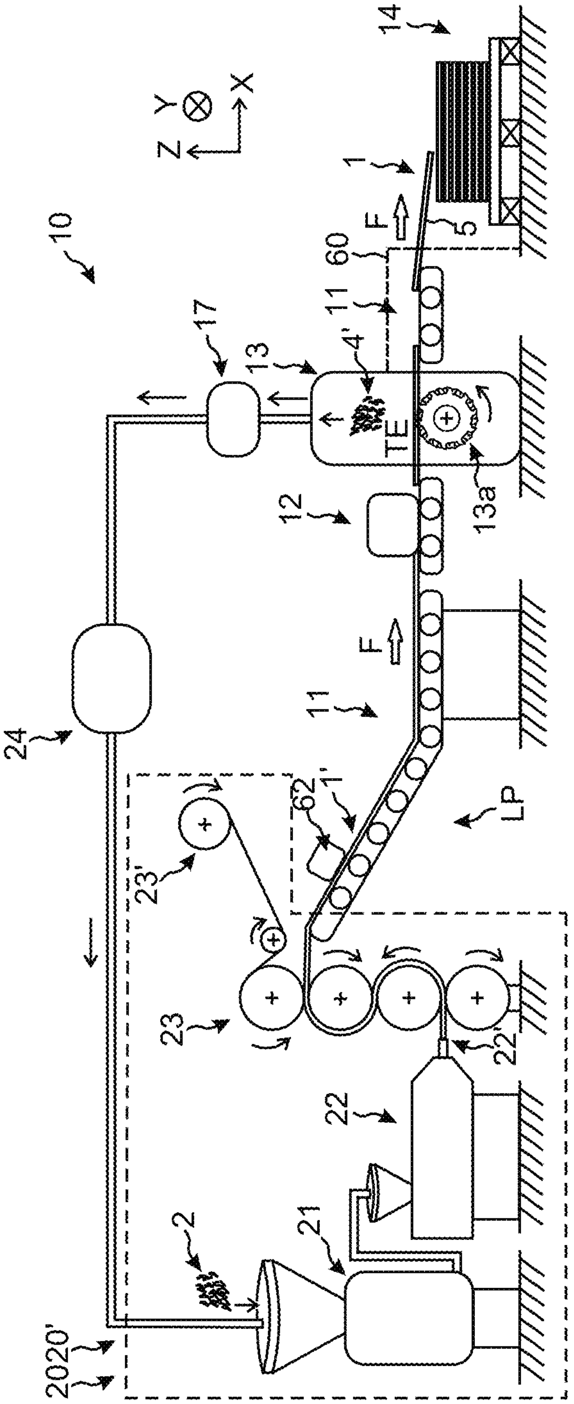
FIGS. 1*a*-1*b* illustrate embodiments of an arrangement for forming grooves in a board element in side views.
Figure 1B:
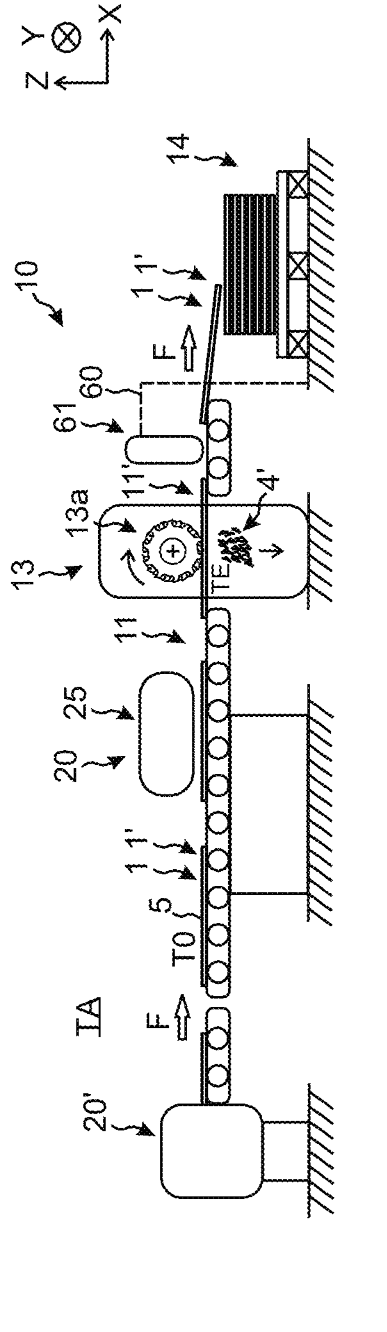

The arrangement 10, shown in, e.g., FIGS. 1*a*-1*b*, comprises a board heating device 20 and a processing device 13. Moreover, the arrangement 10 comprises a frame member 60 extending in a longitudinal X, a transverse Y, and a vertical Z direction. The arrangement preferably further comprises a transportation device 11 adapted to displace the board element 1' or panel 1 in a feeding direction F. A feeding speed may be 0.5-300 m/min, such as 0.5-160 m/min. For example, a feeding speed in the range 0.5-20 m/min may be preferred in relation to, such as directly after, formation of a board element 1' by extrusion, cf. the discussion below where an extruder 22 is introduced. The transportation device may displace the board element between the board heating device 20 and the processing device 13 and preferably also away from the processing device, such as between the processing device 13 and a transport and/or storage unit 14, such as a pallet, on which board elements 1' or panels 1 may be stacked and, preferably, finally cooled. The transportation device 11 may comprise any of at least one roller, a conveyor belt, a movable plate, etc.

In some embodiments, the board heating device 20 may be provided in a board forming arrangement 20'. The board forming arrangement 20' shown in FIGS. 1*a* and 1*b* are suitable for forming a board element comprising a thermoplastic material and, preferably, a filler. The board forming arrangement 20' shown in FIG. 1*b* is also suitable for forming a board element 1' comprising a thermoset and, optionally, a filler.

As shown in, e.g., FIG. 1*a*, the board forming arrangement 20' may comprise a material container 21, preferably comprising a hopper, an extruder 22, and a roller arrangement 23. Raw material 2, and optionally removed material 4' described further below, may be fed into the material container 21, which is configured to feed the material 2, 4' to the extruder 22. The extruder may comprise at least one screw and/or a heater, and the material, preferably in the form of a paste, may pressed out from the extruder under pressure by means of a die 221. The roller arrangement 23 may comprise at least one roller and may process the extruded material from the extruder 22, such as for obtaining a substantially constant thickness and/or for calibrating the extruded material. The roller arrangement 23 may comprise a hot roller for improving lamination of layer(s) of the board element and/or for embossing of a top structure of the board element. A core and/or another layer of a board element 1' or panel 1, such as a lower and/or an upper layer, may be formed as a layer of extruded material in accordance with the principles described herein.

The raw material 2 and/or removed material 4' may be provided in the form of pellets, granules, powder, flakes, shavings, etc., and may comprise a thermoplastic material, such as PVC, PE, thermoplastic PU (TPU), PP, PET or acrylonitrile butadiene styrene (ABS), and, preferably, a filler, such as an inorganic filler. Optionally, a plasticizer, additives, colourants, etc., may be included.

Optionally, the board forming arrangement 20' may further comprise a top structure roller arrangement 23' for providing a wear layer and/or a décor layer, such as a print layer, on the board element 1', preferably by lamination.

A trimming device 62 for trimming of edge portions, preferably a pair of opposite edge portions 1*a*, 1*b*, 1*c*, 1*d*, of the formed board element 1' may be provided after the board forming arrangement 20', preferably before the processing device 13.

Figure 2A:
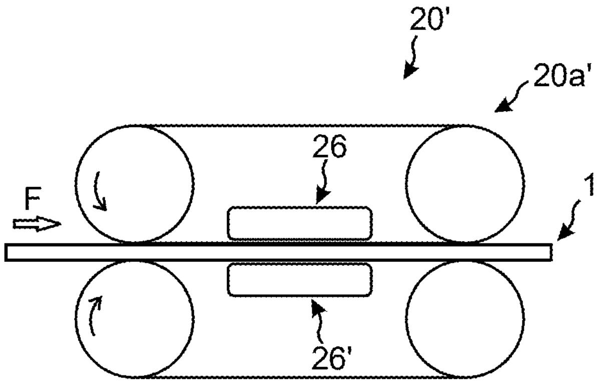
FIGS. 2*a*-2*b* illustrate embodiments of a pressing device in side views.
Figure 2B:
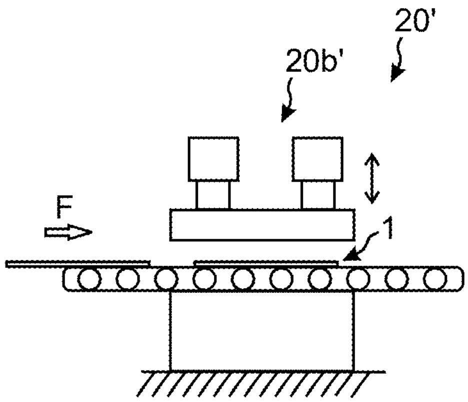

The board forming arrangement 20' in FIG. 1*a* may be a replaced with a board forming arrangement 20' configured to form a board element 1' in a continuous process, such as comprising a double-belt press 20*a*' illustrated in FIG. 2*a* or by lamination using rollers (not shown), such as lamination of at least two layers, each comprising a polymer-based material and, preferably, a filler. The double-belt press 20*a*' may comprise an upper 26 and a lower 26' press table configured to apply pressure, and preferably heat, on a polymer-based material for forming the board element 1'. Alternatively, the board forming arrangement 20' in FIG. 1*a* may be a replaced with a board forming arrangement 20' configured to form a board element 1' in a discontinuous process, such as comprising a static press 20*b*' illustrated in FIG. 2*b*. For example, at least two sheets may be stacked on top of each other and may, for example, be laminated to each other in a static press under pressure and, preferably, heat for forming a panel 1 comprising at least two layers. In an alternative example, the at least two sheets may be adhered to each other by an adhesive in a static press under pressure for forming the panel 1. Each sheet may comprise a polymer-based material and, preferably, a filler.

In some embodiments, the board heating device 20 is a separate heating device 25, such as a heating oven, an infrared heating element or at least one heated roller, which is schematically illustrated in FIG. 1*b*. The heating oven or infrared heating element may be configured to heat the entire board element 1' or panel 1. Preferably, the heated roller(s) are arranged to heat a rear side 5 of the board element. Thereby, a risk of damaging a front side 6, which may comprise décor layer or similarly, of the board element may be reduced.

Grooves 3 may be formed by the processing device 13 by removing material 41, such as chips, from the board element 1'. The board element, such as a rear 5 or a front 6 side thereof, may be arranged in contact with a support member 11' during forming of the grooves, e.g., being provided by portions of the transportation device 11. The processing device 13 and the board element 1' may be displaceable with respect to each other during forming of the grooves, such as in a vertical direction Z and/or perpendicularly to the feeding direction F, see, e.g., arrow B in FIGS. 2*c*, 3*b* and 6*a*. An ordinarily skilled artisan will appreciate that the displacement may be controlled by a control unit (not shown). In some embodiments, the processing device and the board element may be stationary with respect to each other during forming of the grooves, such as in a vertical direction Z and/or perpendicularly to the feeding direction F. Clearly, however, the processing device may comprise rotating components per se.

In some embodiments, and as shown in, e.g., FIGS. 1*a*-1*b* and 2*c*-2*e*, the processing device 13 comprises or is a rotational cutting device 13*a*, 13*a*1, preferably comprising at least one cutting element 15, 15', each comprising a plurality of tooth elements 16, 16' configured to rotate around a rotational axis A1, A1'. A diameter do of each cutting element may be 50-400 mm, such as 100-200 mm. Moreover, a rotation speed may be 1000-12000 rpm, such as 2000-7000 rpm, preferably 3000-4500 rpm. For example, a cutting element having a diameter of 100-200 mm, such as 150-170 mm, may be rotated at a rotation speed of 2000-7000 rpm, such as 3000-4500 rpm.

Figure 2C:
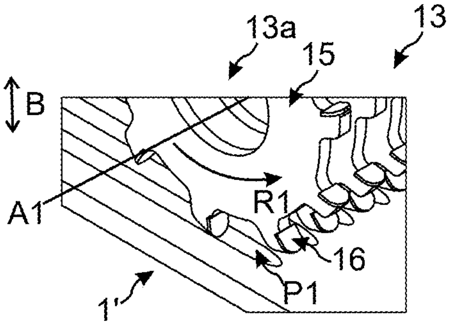
FIGS. 2*c*-2*e* illustrate embodiments of a processing device in zoomed-in perspective views and in a perspective view.
Figure 2D:
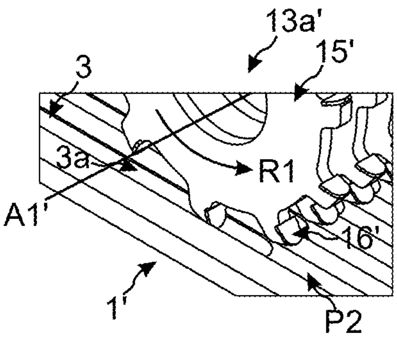

The embodiment in FIG. 2*c* may correspond to a single rotating cutting device 13*a*. Alternatively, the embodiment in FIG. 2*c* may correspond to a first rotating cutting device 13*a* and the processing device 13 may further comprise a second rotating cutting device 13*a*' as illustrated in the embodiment in FIG. 2*d*, preferably located downstream of the first rotating cutting device 13*a* along the feeding direction F. This is shown in the embodiment in FIG. 2*e*.

Preferably, the cutting elements 15, 15' of the first and second rotating cutting devices are aligned, preferably in a lateral direction L. A first cutting element 15 of the first rotating cutting device 13*a* may form a first groove profile P1, and, thereafter, a second cutting element 15' of the second rotating cutting device 13*a*' may form a second groove profile P2. As illustrated in FIG. 2*f*, the second groove profile P2 may have a larger cross-sectional area C2 than a cross-sectional area C1 of the first groove profile P1. The profile P2 may correspond to a, preferably final, profile of the groove 3. The cross-sectional area may be an area defined by a horizontal plane HP provided along the rear side 5 and the respective groove profile P1, P2, such as at a specific longitudinal position of the groove which is to be formed. The second groove profile P2 may be formed to widen, deepen, and/or change the shape of the first groove profile P1. For example, the second cross-sectional area C2 may be at least 20%-200% the size of the first cross-sectional area C1, or at least 50%-150% the size of the first cross-sectional area C1. The second groove profile P2 may be similar or the same as the first groove profile P1, except that the second groove profile P2 is deeper than the first groove profile P1.

Generally herein, the cross-sectional area of a final groove profile may be from 1 $mm^2$ to 30 $mm^2$, from 2 $mm^2$ to 25 $mm^2$, or from 3 $mm^2$ to 20 $mm^2$. A final groove profile may have a width (measured at the opening) of from 0.5 to 20 mm, from 1 to 10 mm, or from 1.5 to 5 mm. A final groove profile may have a depth of from 0.3 to 10 mm, from 0.5 to 5 mm, or from 0.8 to 4 mm. It is clear that the final groove profile may correspond to the first P1, or alternatively the second P2, groove profile, e.g., depending on the number of rotating cutting devices used in the forming.

Generally herein, the rotating cutting device 13*a*, 13*a*' may operate in an up-cut direction R1, as illustrated in, e.g., FIGS. 1*a*-1*b* and 2*c*-2*e*, or a down-cut direction R2, see page 8, lines 23-27, page 32, lines 24-30, and page 37, lines 15-26, in WO 2020/180237 A1 whose content hereby is incorporated by reference in its entirety.

The rear side 5 of the board element 1' may be configured to face downwards or upwards during forming of the at least one groove 3 as shown in, e.g., FIG. 1*a* and FIG. 1*b*, respectively.

Figure 3A:
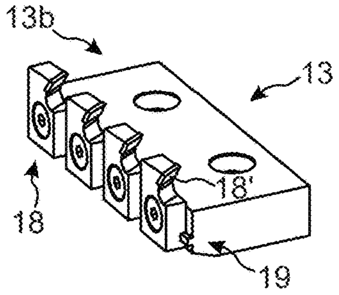
FIGS. 3*a*-3*b* illustrate embodiments of a processing device in a perspective view and in a side view.
Figure 3B:
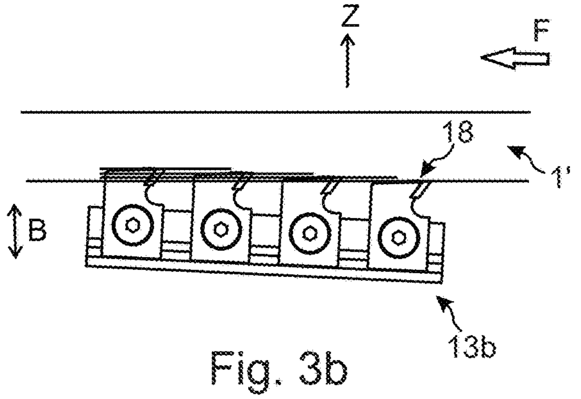

In some embodiments, and as shown in, e.g., FIGS. 3*a*-3*b*, the processing device 13 comprises or is a carving tool 13*b* comprising at least one cutting tooth 18, preferably a plurality of cutting teeth configured to be fixedly mounted in a tooth holder 19. The tooth holder 19 may be fixedly mounted or displaceably mounted in a frame member 60 of the arrangement 10. The cutting teeth 18 may be arranged after each other along the feeding direction F in operation, preferably being vertically displaced with respect to each other as shown in FIG. 3*b*. Thereby, the cutting teeth may gradually remove material from the board element. Each cutting tooth 18 may comprise a cutting surface 181, which preferably is inclined with respect to the vertical direction Z.

Figure 6A:
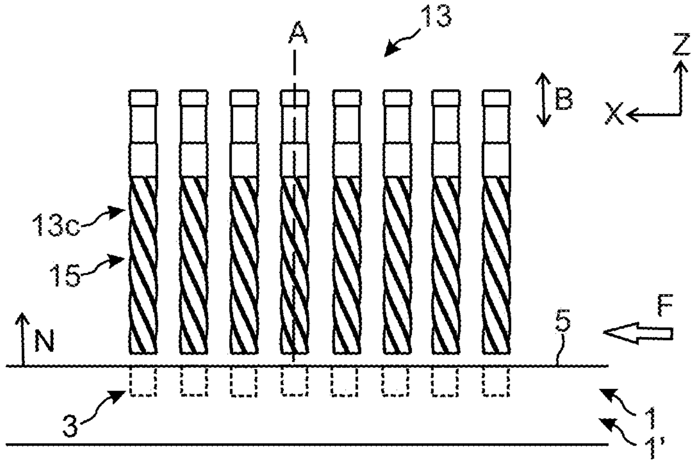
FIGS. 6*a*-6*b* illustrate embodiments of a processing device in a side view and a top view.
Figure 6B:
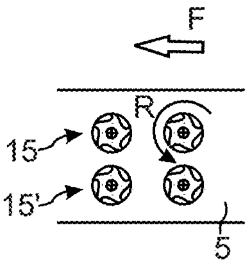
Figure 6C:
FIGS. 6*c*-6*f* illustrate embodiments of a board element, such as a panel, in cross-sectional side views.
Figure 6D:
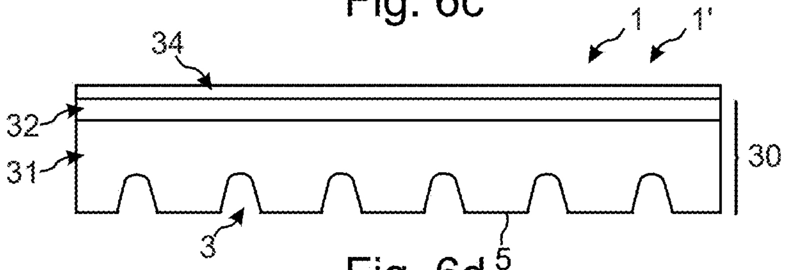
Figure 6E:
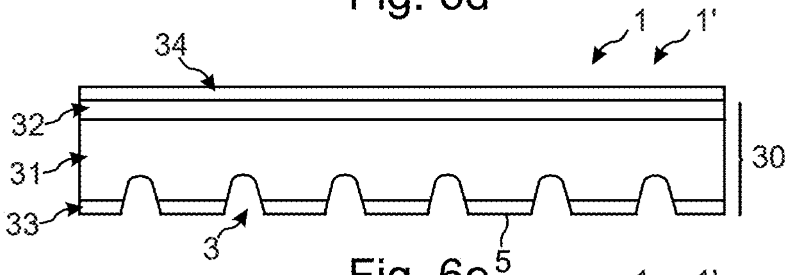
Figure 6F:
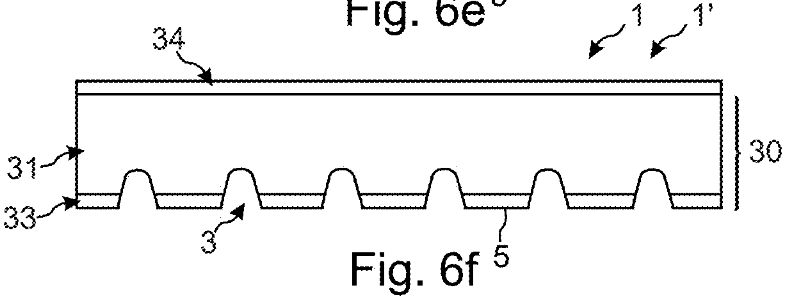
Figure 7A:
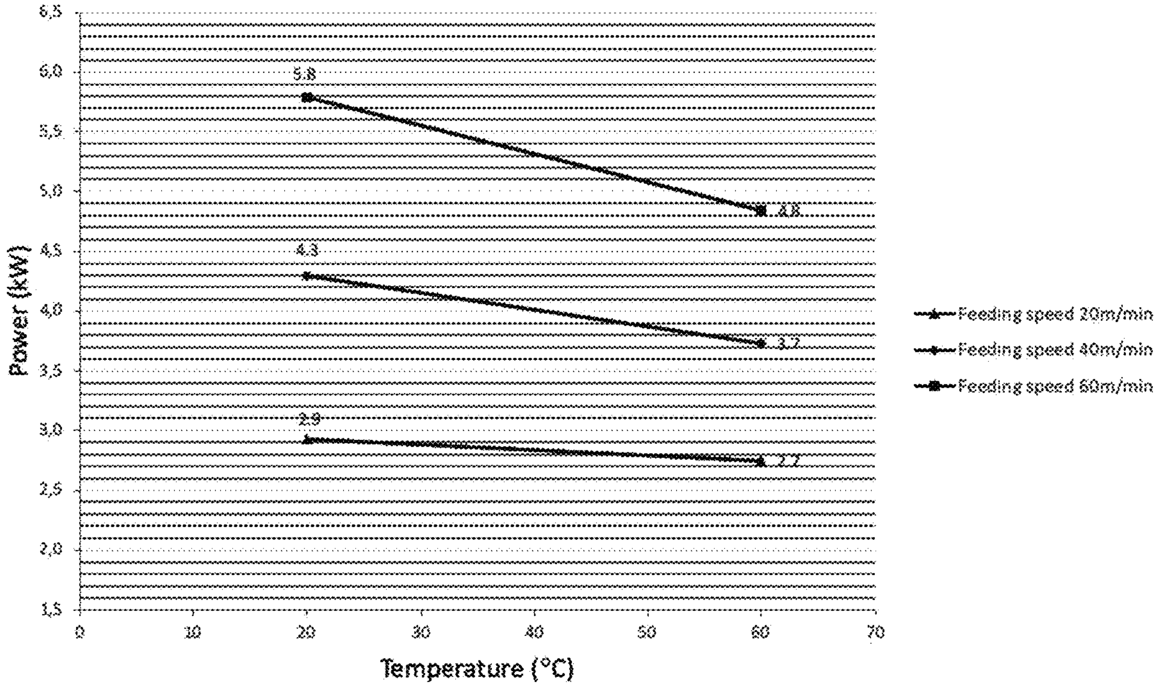
FIGS. 7*a*-*b*, 8*a*-*b* illustrate diagrams of a maximal power consumption of a rotational cutting device when forming grooves in samples at various sample temperatures and feeding speeds.
Figure 7B:
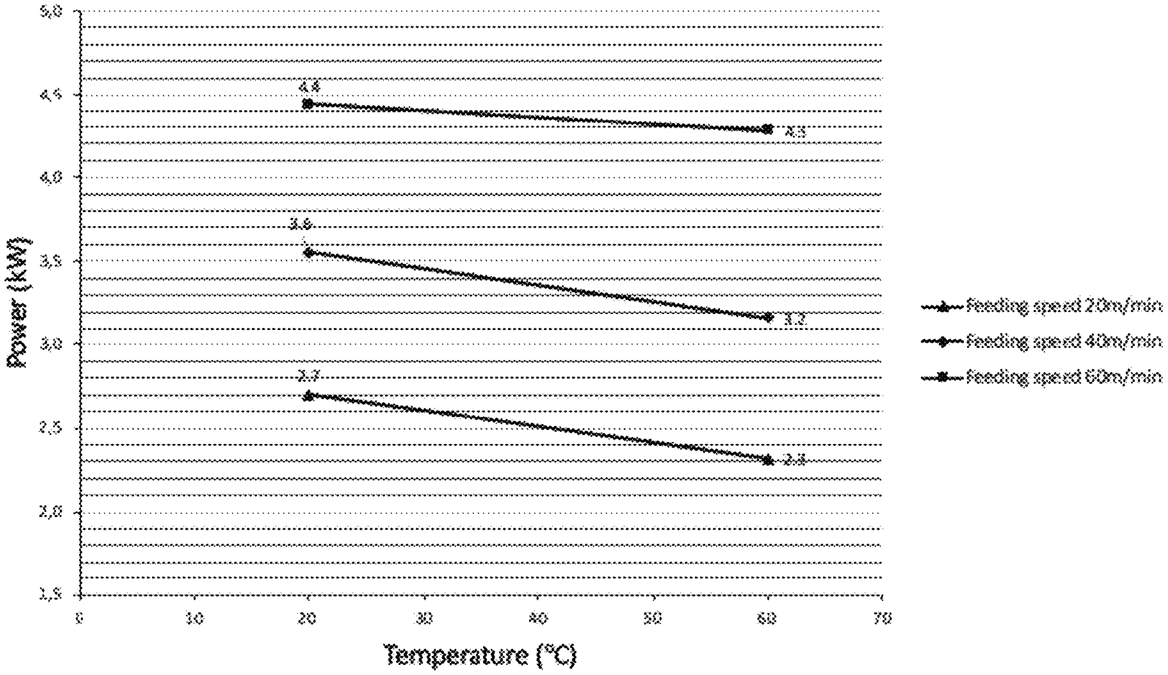
Figure 8A:
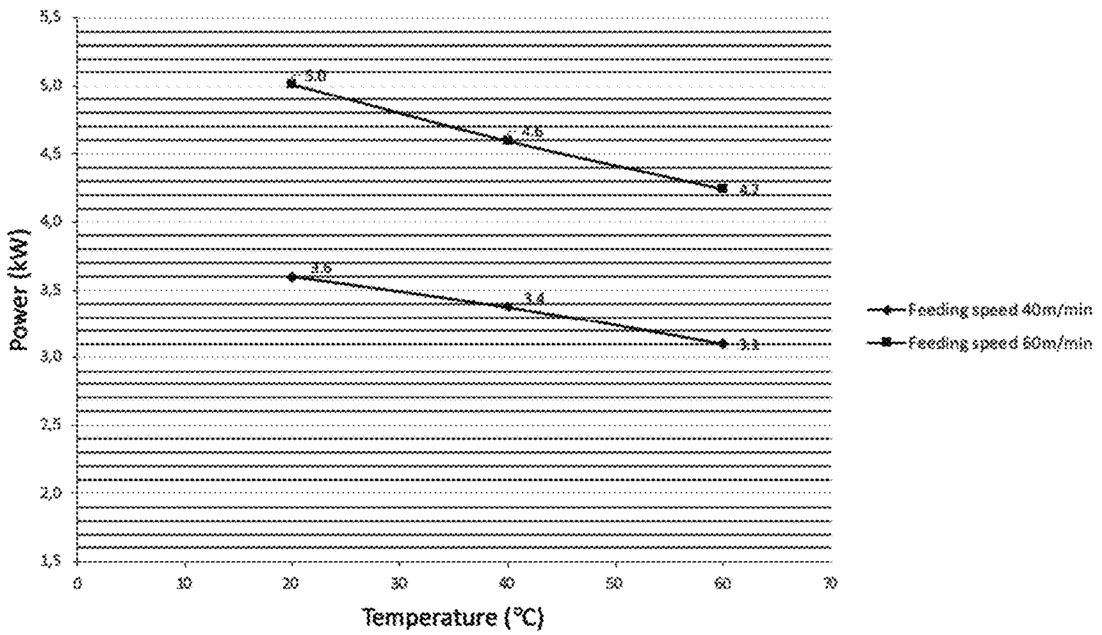
Figure 8B:
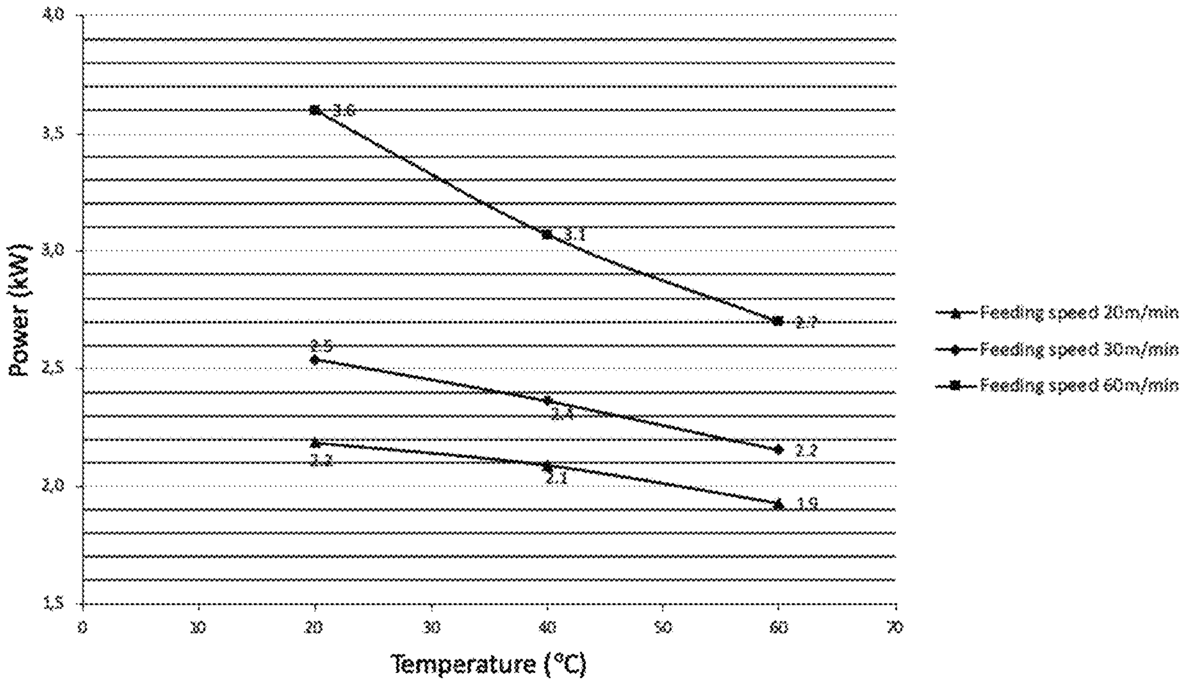

In yet some embodiments, and as shown in, e.g., FIGS. 6*a*-6*b*, the processing device 13 comprises or is a drilling or milling tool 13*c* comprising at least one, preferably a plurality of, cutting element(s) 15, 15' configured to rotate in a direction R around a rotational axis A provided essentially in parallel with a normal N of the board element 1' or panel 1 in operation. A diameter of the cutting elements may be 1-15 mm, such as 1-6 mm or 2-4 mm. The processing tool 13 may be displaceably mounted in the frame member 60, such as being displaceable at least in a direction B perpendicular to a feeding direction F and preferably being parallel with the vertical direction Z in operation. In operation, the milling tool, such as the cutting elements 15, 15' thereof, may be displaceable along and/or perpendicularly to the feeding direction F, preferably along the lateral direction L. The drilling or milling tool 13*c* may function and may form grooves 3 such as those described in WO 2020/180237 A1, in particular on page 56, lines 27-33 and FIGS. 15*k*, 17*d* and 17*e*, the content of which hereby is incorporated by reference in its entirety.

The arrangement 10 may further comprise a material collecting device 17, such as a suction device and/or a blowing device, for collecting the removed material 4'. The removed material 4' may be recycled for forming new board elements 1'. As shown in FIG. 1*a*, the removed material may be fed back into the material container 21 together with the raw material 2. Optionally, the removed material 4' may be processed in a processor unit 24, such as grinder and/or a material separator, before feeding it into the material container 21. For example, the removed material may be separated into material groups having preferred characteristics and/or may be cut into preferred sizes. The characteristics may be at least one selected from the group of material compositions, sizes, weights, shapes, and densities of the removed material 4'.

The arrangement 10 may comprise a board dividing device 12 configured to divide the board element 1' into at least two panels 1, such as by sawing, cutting or breaking. The board dividing device 12 may be located before the processing device 13 as shown in FIG. 1*a*, but it is equally conceivable that it is located in the board forming arrangement 20', cf. FIG. 1*b*, or after the processing device, cf. FIG. 3*e* where the board element 1' comprises grooves 3 and is dividable into at least two panels 1.

It is clear that in some embodiments, the processing device 13 may be located between the board forming arrangement 20' and the board dividing device 12. For example, the processing device 13 may be located directly after the board forming arrangement 20', such as at the location LP indicated in FIG. 1*a*.

The panel 1 may comprise a first 1*a*, 1*b* and a second 1*c*, 1*d* pair of opposite edge portions, preferably being short and long edge portions, respectively. In any embodiment herein, the arrangement 10 may comprise a machine 61, such as a cutter, for forming a locking device 9 on the panel, such as a floor panel or a wall panel. The locking device 9 may be configured to lock the panel to (an) adjacent panel(s) vertically and/or horizontally. For example, the machine 61 may be located after (downstream of) the processing device 13, see, e.g., FIG. 1*b*, but a location before (upstream) is equally conceivable.

Next, embodiments of a method for forming grooves in a board element 1' will be described with reference to the flow charts U10 and U10' in FIGS. 5*a*-5*b*. The method may be implemented in the arrangement 10, such as in any of the embodiments in FIGS. 1*a*-1*b*, 2*a*-2*f*, 3*a*-3*b* and 6*a*-6*b*, for forming board elements or panels, such as in any of the embodiments in FIGS. 3*c*-3*e*, 4*a*-4*c* and 6*c*-6*f*.

Figure 3C:
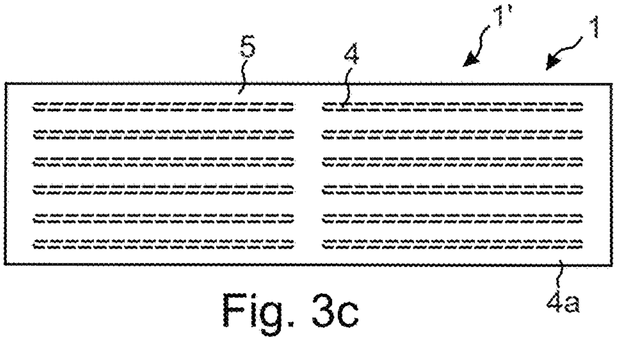
FIGS. 3*c*-3*e* illustrate embodiments of a board element or a panel in a bottom view and in perspective views as seen from above and below.
Figure 3D:
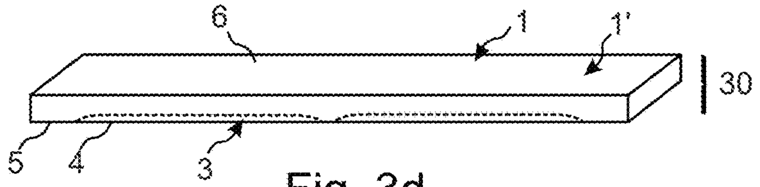
Figure 3E:
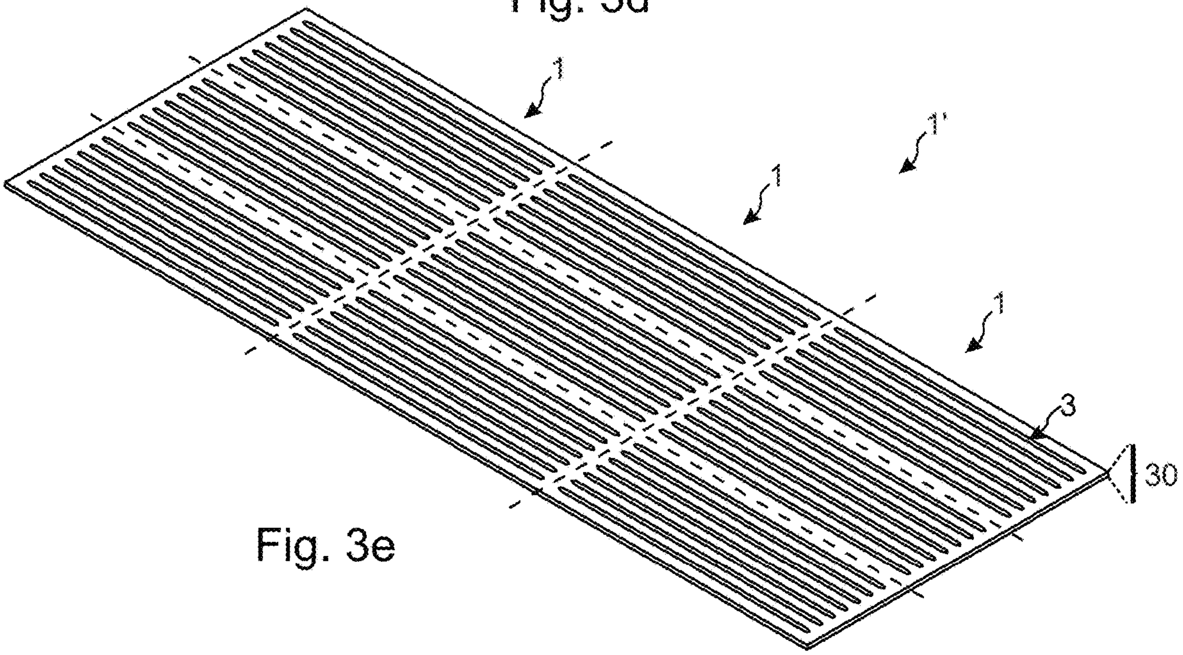
Figure 4A:
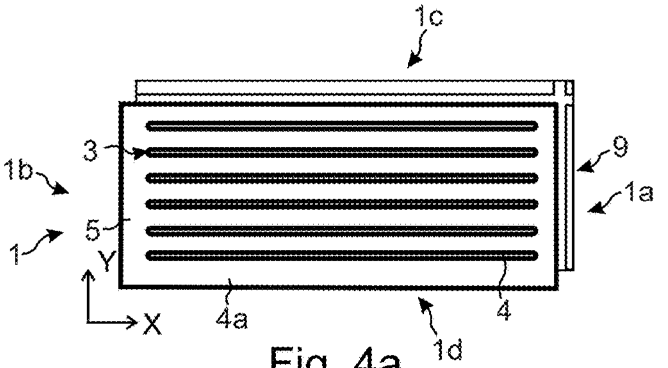
FIGS. 4*a*-4*c* illustrate embodiments of a panel in a bottom view and in side views or cross-sectional side views.
Figure 4B:
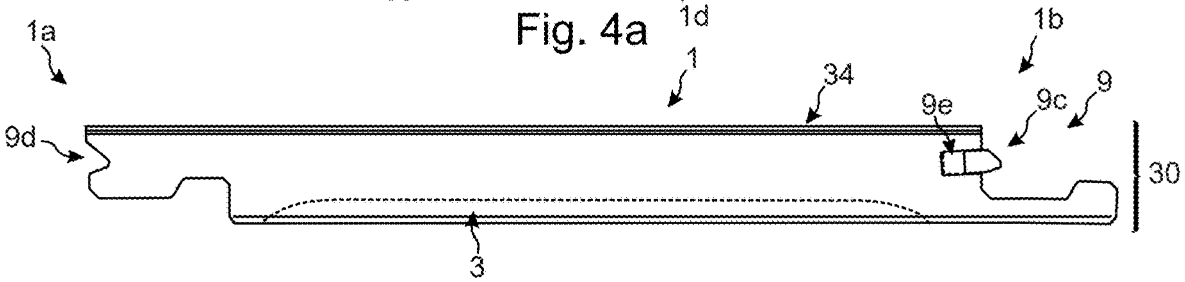
Figure 4C:
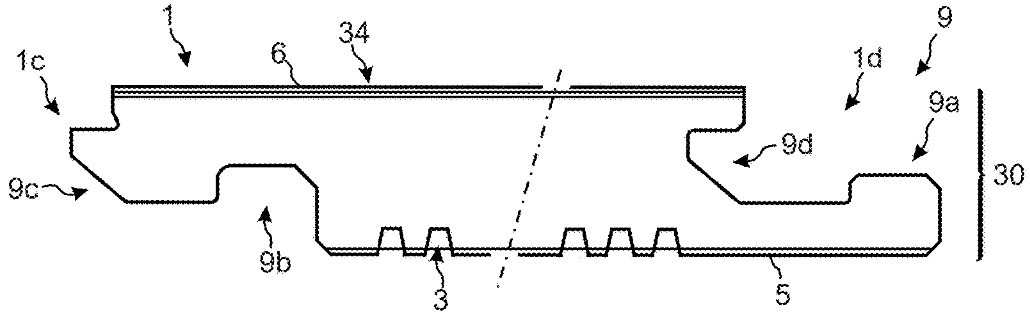
Figure 5A:
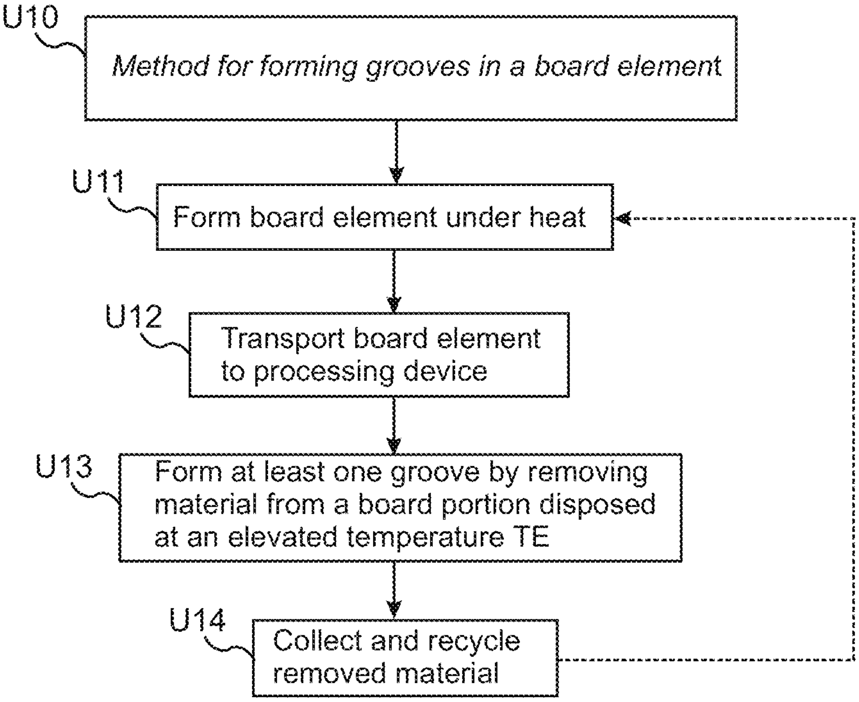
FIGS. 5*a*-5*b* are flow charts illustrating embodiments of methods for forming grooves in a board element.

With reference to FIG. 5*a* and, e.g., FIG. 1*a*, a board element 1' may be formed by a board forming arrangement 20' under heat and, preferably, pressure (Box U11). Thereby, an elevated temperature TE of a board portion 4 of the board element 1' is obtained. After forming the board element it is transported to the processing device 13 (Box U12) and groove(s) 3 are formed by removing material 4', such as chips, from the board portion 4 disposed at the elevated temperature TE (Box U13). Optionally, the board element, in particular the board portion 4, may undergo a partial cooling when it is transported from the board forming arrangement 20' to the processing device 13. An embodiment of such a board portion 4 provided in the rear side 5 is illustrated in FIG. 3*c* and embodiments of the resulting groove(s) 3 are illustrated in FIGS. 3*d*-3*e* and 4*a*-4*c*. The residual portion(s) 4*a* of the rear side 5, which is separate from the board portion 4, is illustrated in FIG. 3*c*. The board portion 4, and hence the groove(s) 3, may be provided between a respective, preferably coplanar, residual portion 4*a*. Conceivable embodiments of layer arrangements 30 and/or top structures 34 are described below in relation to FIGS. 6*c*-6*f*, whereby reference is made thereto. In any embodiment herein, the grooves 3 in a panel 1 may be continuous as illustrated in FIGS. 3*e* and 4*a*-4*b* or discontinuous as illustrated in FIG. 3*d*, but also see FIG. 3*c*. As explained elsewhere herein, the board forming arrangement 20' in FIG. 1*a* may be replaced with a board forming arrangement 20' configured to form a board element 1' in a continuous process or a discontinuous process, whereby reference is made thereto.

Figure 5B:
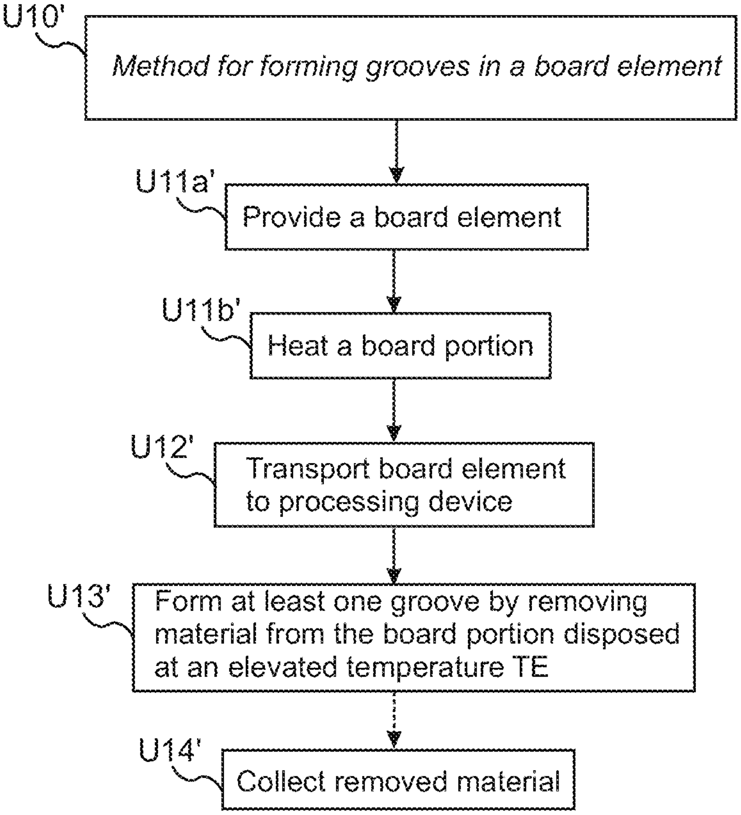

With reference to FIG. 5*b* and, e.g., FIG. 1*b*, a board element 1' may be provided (Box U11*a'*), preferably at an initial temperature TO, and the board portion 4 may be heated by a board heating device (Box U11*b'*) in the form of a separate heating device 25. The board element may be preformed. A temperature of the board portion 4 is thereby elevated from the initial temperature T0 to an elevated temperature TE. Thereafter, groove(s) 3 may be formed (Boxes U12' and U13'), e.g., in complete analogy with the discussion in relation to FIG. 5*a* (Boxes U12 and U13). Here and elsewhere in the disclosure, such as in embodiments described in relation to FIG. 5*a*, the elevated temperature TE may be at least 10° C. above the initial temperature, such as at least 20° C. above the initial temperature, such as at least 50° C. above the initial temperature, for example, at least 10° C. to 280° C. above the initial temperature, or at least 10° C. to 150° C. above the initial temperature, or at least 10° C. to 100° C. above the initial temperature. As described elsewhere herein, the initial temperature may be a temperature acclimatized to the ambient temperature and/or a temperature before heating.

Optionally in any of the embodiments above, the board element 1' may be divided into at least two panels 1 by a board dividing device 12, preferably while the board element is provided above an initial temperature and/or an ambient temperature TA. In some embodiments, a locking device 9 may be formed by the machine 61 on at least one edge portion 1*a*, 1*b*, 1*c*, 1*d* of the panel(s) 1, preferably on two opposite edge portions thereof. The locking device 9 may be configured to lock the panels horizontally and/or vertically. A horizontal locking device may comprise a locking element 9*a* and a locking groove 9*b*. A vertical locking device may comprise a tongue 9*c* and a tongue groove 9*d*, see, e.g., FIGS. 4*b*-4*c*. The tongue may be integrally formed with the panel (FIG. 4*c*) or it may be a separately formed displaceable tongue provided in a displacement groove 9*e* (FIG. 4*b*).

The removed material 4' may be collected (Boxes U14 and U14') and, in some embodiments, the removed material 4' may be recycled (Box U14) as described above in relation to, e.g., FIG. 1*a*.

Generally, and as shown in FIGS. 6*c*-6*f*, the board element 1', such as a panel 1, described herein, such as in any of FIGS. 1*a*-1*b*, 2*a*-2*f*, 3*c*-3*e*, 4*a*-4*c* and 5*a*-5*b*, may comprise a layer arrangement 30 comprising at least one layer. Each layer may comprise a polymer-based material and, preferably, a filler. The board element may comprise a core 31 and, optionally, an upper 32 and/or a lower 33 arrangement attached to the core 31. The lower arrangement 33 may comprise at least one lower layer. The groove(s) 3 may be provided in the lower arrangement 33, such in a rear side 5 thereof. Optionally, one lower layer, preferably a lowermost layer, may be a balancing layer. The upper arrangement 32 may comprise at least one upper layer.

The core 31 may comprise a thermoplastic material, for example comprising PVC, PE, TPU, PP, PET or ABS, and a filler, such as an inorganic filler. Furthermore, the upper 32 and/or the lower 33 arrangements may comprise at least one thermoplastic layer, for example comprising PVC, PE, TPU, PP, PET or ABS, and a filler, such as an inorganic filler.

The board element may comprise a top structure 34 provided on, such as attached to, the layer arrangement 30, the top structure preferably comprising a décor layer, such as a print layer. The top structure 34 may comprise or may be a top layer. The top structure 34 may comprise a coating layer, such as a UV curable coating layer, a lacquer or a hot-melt coating layer, and/or a wear layer, such as a thermoplastic film. The thermoplastic film may comprise PVC, PU, TPU or PET.

The core 31 and, optionally, the upper layer(s) 32 and/or the lower layer(s) 33 may be provided as sheets or may be provided on rolls and may be laminated to each other, preferably under heat and pressure. The sheets may be stacked on top of each other and may, for example, be laminated to each other in a discontinuous process, such as a static press, for example a hot press or a multi-daylight static press. Alternatively, the sheets may be adhered to each other. The layers provided on rolls may be laminated to each other in a continuous process, such as by lamination using rollers or a double-belt press. In some embodiments, the core 31 may be (co-)extruded, optionally with at least one upper 32 and/or lower 33 layer, such as with all upper and lower layers except for the wear layer and/or the print layer.

Clearly, the panel 1 in any of FIGS. 6*c*-6*f* may be provided with a locking device 9 on a first 1*a*, 1*b* and/or a second 1*c*, 1*d* pair of opposite edge portions, see, e.g., FIGS. 4*a*-4*c*.

A density of a core 31 comprising a thermoplastic material may be 900-2400 kg/$m^3$, preferably 1500-2400 kg/$m^3$. A density of an upper layer and/or a lower layer comprising a thermoplastic material may be 900-2400 kg/$m^3$, preferably 1500-2400 kg/$m^3$.

In some embodiments, however, the core 31 may comprise a thermoset and, optionally, a filler. The core may be an HDF board. The upper 32 and/or lower 33 arrangement(s) may comprise at least one thermosetting-based layer and, optionally, a filler. For example, the lower and/or upper arrangements may comprise at least one powder-based layer, optionally comprising a veneer layer. The powder-based layer may comprise fibres, such as wood fibres, a thermoset, such as a melamine formaldehyde resin, and, optionally, colourants.

Example 1

To test the effect of the method in accordance with the first aspect, measurements of a power consumption when forming grooves by a rotational operation in each of a set of samples S1, S2 in the form of SPC panels and T1, T2 in the form of LVT panels were conducted.

S1 and T1 each comprised a core in which grooves were formed and a décor layer. Specified in weight percentages, the core of S1 comprised 27.21% PVC (Norvinyl™ S5745), 68.03% $CaCO_3$ (Greenafiller™ 0-100), 0.54% pigments (Titanium Dioxide), 2.72% stabilizer (Baerostab™ CT 1229 P), 0.20% processing aid and internal lubricant (Baerocid™ SMS 1A), 0.20% lubricant (Baerolub™ PA 200), 0.82% impact stabilizer (Addstrength™ CPE-3516), 0.27% impact modifier (Kane Ace™ B580) and the core of T1 comprised 16.92% PVC (Norvinyl™ S5745), 76.14% $CaCO_3$ (Greenafiller™ 0-100), 0.34% stabilizer (Baerostab™ CT 1228 R), 0.08% lubricant (Baerolub™ PA Special), 6.43% plasticizer (Eastman™ 168) and 0.08% black pigments.

S2 was a Grey Beach NC7014 panel in the Crystal SPC collection of Ultimate Floors, Batch No. LVT2018041. T2 was a panel from Creation 55 Clic, Commercial Flooring, of Gerflor. A thickness of the samples S1, S2 and T1 was 4 mm and a thickness of the sample T2 was 5 mm. The density of S1 and S2 was approximately 2000 kg/$m^3$ and the density of T1 and T2 was approximately 1600 kg/$m^3$.

Figure 2E:
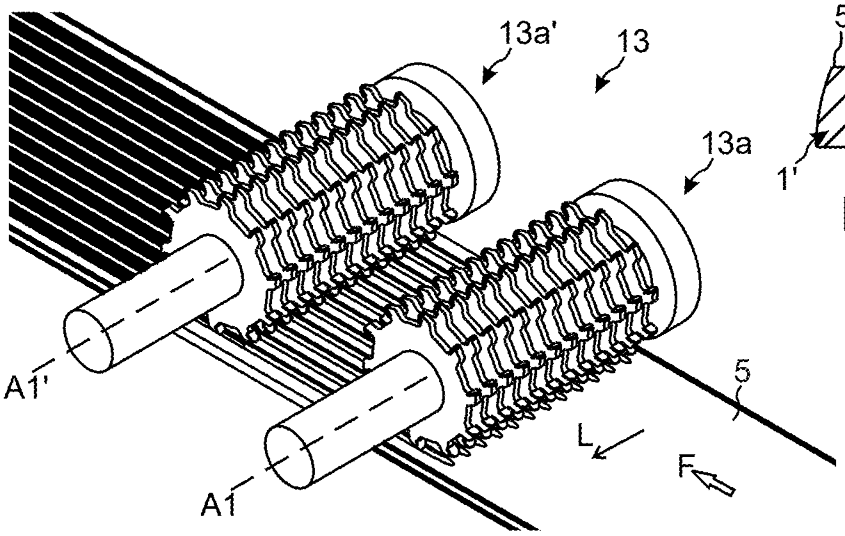
Figure 2F:
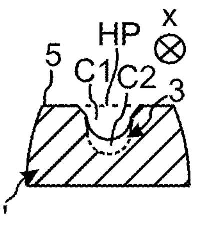
FIG. 2*f* illustrates a cross-sectional side view of an embodiment of a portion of a board element zoomed-in around a single groove.

Six grooves having a length of 460 mm, width 3 mm, and depth 2 mm were formed between the short side edges of the samples S1, S2, T1 and T2 with an up-cut rotational cutting device comprising six cutting elements arranged side-by-side and rotating synchronously at 4500 rpm (cf. a single rotational cutting device 13*a* in FIGS. 2*c* and 2*e*). Each cutting element had a diameter of 150 mm and comprised six cutting teeth with a width of 3 mm. The cutting elements were arranged along a single rotational axis A1 and were separated by 3 mm along the axis. The sample was fed in a feeding direction F towards the rotational cutting device and a front side of the sample was held down in contact with a support member by a vacuum table. The cutting elements and the sample were stationary with respect to each other during the forming of the grooves perpendicularly to the feeding direction F of the sample and in a direction normal to the rear surface of the sample. The sample was heated to a substantially uniform temperature in a heating oven. A maximal power consumption of the rotational cutting device when forming the grooves at various sample temperatures and feeding speeds was measured, the result of which is illustrated in FIGS. 7*a*, 7*b*, 8*a* and 8*b* for S1, T1, S2 and T2, respectively. It may be seen that for a given sample and a fixed feeding speed, the power consumption decreased as the sample temperature increased.

Similar measurements of the power consumption as described for S1, S2 and T1, T2 were also conducted on a set of samples V1, V2 and V3 comprising PU, PP and rPET (recycled PET), respectively.

V1 was a Purline panel of Wineo, Batch No. 09.04.2019, 15:13, 2368227 4214889 PLC050R and V2 was a Classen NEO 2.0 panel, Batch No. N 2R C0:21 K6 2051586 V 1520353. Moreover, V3 comprised 30 wt % rPET, 15 wt % recycled PE, 50 wt % $CaCO_3$, and 5 wt % additives. A thickness of the samples V1, V2 and V3 was 5 mm, 4.5 mm and 3 mm, respectively, and the density of V1, V2 and V3 was approximately 1909 kg/m$^3$, 1472 kg/m$^3$, and 1532 kg/m$^3$, respectively.

Grooves were formed in the samples V1, V2 and V3 using a rotational cutting device, and for sample temperatures above 20° C. also using a heating oven, in a similar manner as for S1, S2, T1 and T2, whereby reference is made to the discussion above. Hence, the characteristics of the grooves formed in V1, V2 and V3, including their numbers, widths and depths, were the same as for S1, S2, T1 and T2.

Figure 9A:
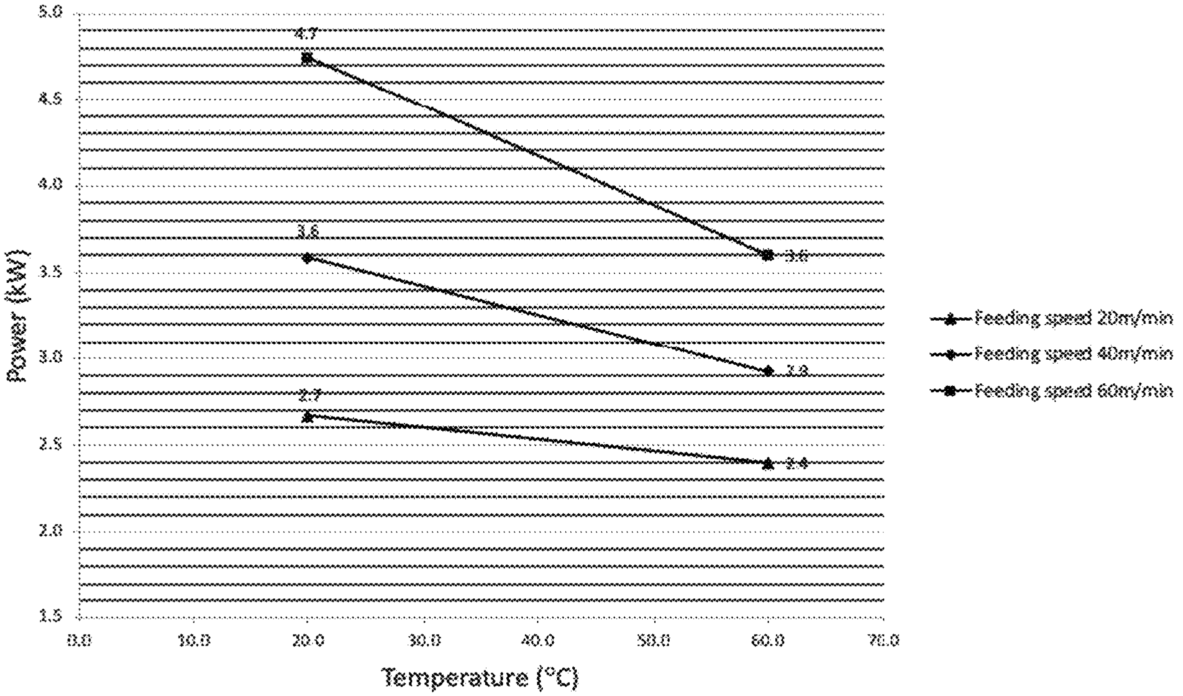
FIGS. 9*a*-*b*, 10 illustrate diagrams of a maximal power consumption of a rotational cutting device when forming grooves in samples at various sample temperatures and feeding speeds.
Figure 9B:
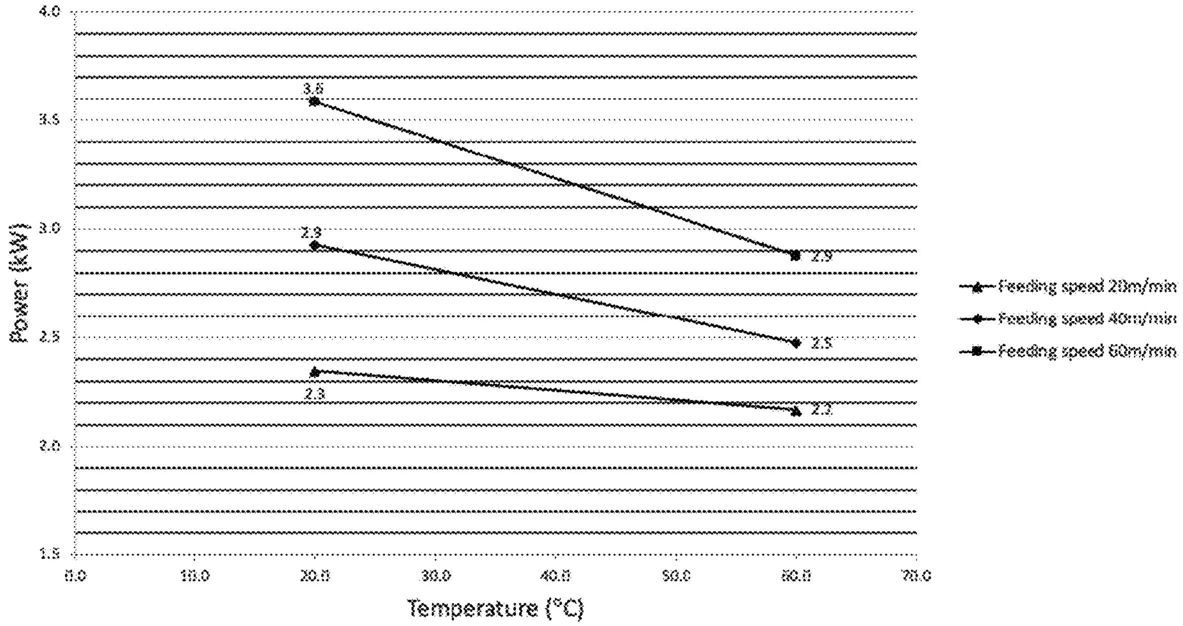
Figure 10:
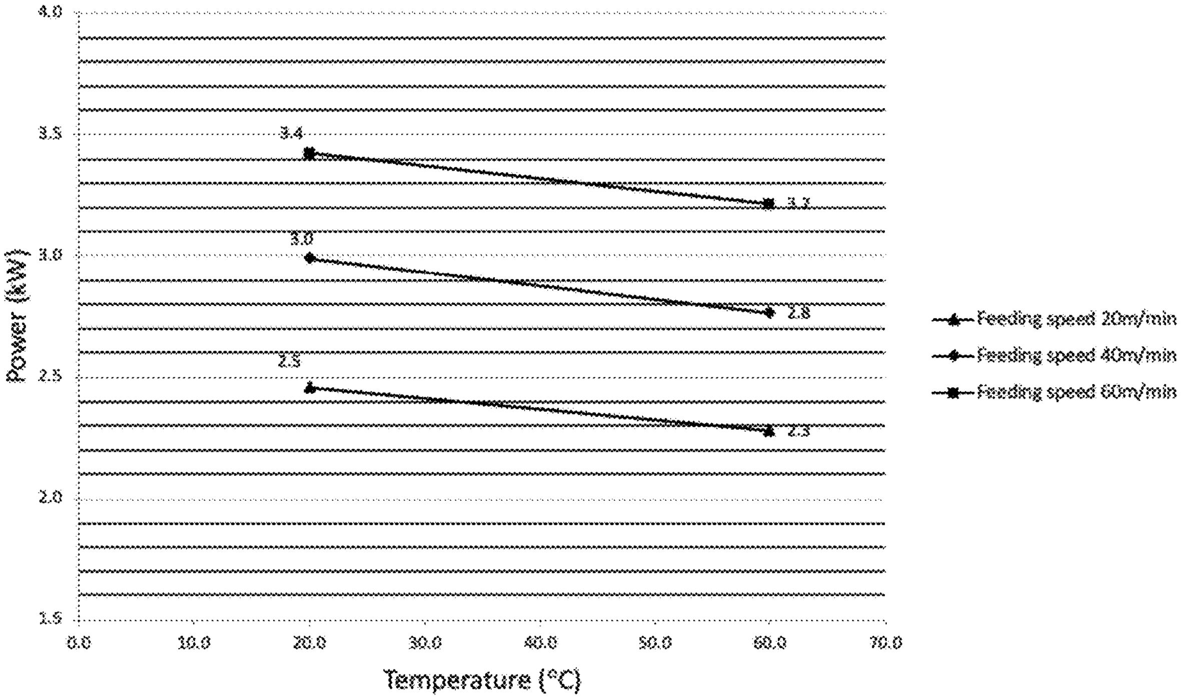

A maximal power consumption of the rotational cutting device when forming the grooves at various sample temperatures and feeding speeds was measured, the result of which is illustrated in FIGS. 9*a*, 9*b* and 10 for V1, V2 and V3, respectively. In analogy with the discussion above it may be seen that for a given sample and a fixed feeding speed, the power consumption decreased as the sample temperature increased.

Example 2

The effect of the method in accordance with the first aspect was further tested by forming grooves by a non-rotational operation in a sample S1' in the form of an SPC panel and T1' in the form of an LVT panel.

S1' was an SPC panel from Shaw Floors and T1' was a panel from Creation 55 Clic, Commercial Flooring, of Gerflor. A thickness of the sample S1' was 4 mm and a thickness of the sample T1' was 5 mm.

Figure 4D:
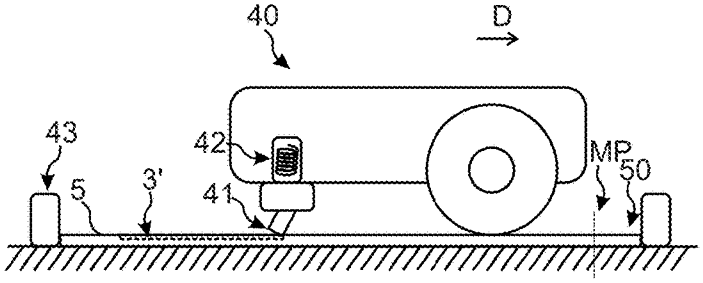
FIGS. 4*d*-4*e* illustrate in side views embodiments of a sledge and a carving tooth used for performing carving measurements.
Figure 4E:
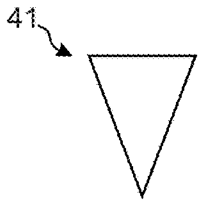

A sledge 40 schematically illustrated in FIG. 4*d* developed in relation to the preliminary standard prEN 14354: 2001 (E) was utilized for testing the carving ability at different temperatures. The sledge was configured to apply a linearly increasing force of an acute carving tooth 41, schematically illustrated in FIG. 4*e*, along the rear side of the sample from a minimal force of 0 N to a maximal force of 60±0.5 N under a displacement of the sledge along a distance of 400 mm. The carving tooth 41 was spring loaded by means of a spring 42. The displacement was made at a substantially constant speed of 67-100 mm/s under 4-6 seconds.

Each sample S1', T1' had a length of 400 mm and was fixed in a longitudinal direction of the sample by means of abutment blocks 43. The sledge 40 was displaced in a horizontal direction D between short edges 1*a*, 1*b* of the sample 50 in accordance with the description above. The acute carving tooth formed a carved groove 3' in a rear side 5 of the sample. A width W and a depth D of the carved groove 3' was measured after a displacement of 400 mm at a measure point MP when the sledge applied said maximal force. The measuring results of the samples S1', T1' performed at sample temperatures 23° C. and 70° C. are summarized in Table 1. It may be seen that the width W and the depth D increased for a given sample as the sample temperature increased. Thereby, it may be seen that the material of the samples became more easily processed.

TABLE 1

Carving measuring results

| | S1' | | T1' | |
|---|---|---|---|---|
| Sample Temperature | Width (mm) | Depth (mm) | Width (mm) | Depth (mm) |
| 23° C. | 0.80 | 0.41 | 1.23 | 0.64 |
| 70° C. | 1.00 | 0.64 | 1.46 | 1.10 |

Aspects of the disclosure has mainly been described above with reference to a few embodiments. However, as is readily appreciated by a person skilled in the art, other embodiments than the ones disclosed above are equally possible within the scope of aspects of the disclosure, as defined by the appended patent claims and items in an embodiment section below. For instance, it is clear that the board forming arrangement 20' in FIG. 1*a* may be a replaced with a board forming arrangement suitable for forming a board element comprising a thermoset, whereby the groove (s) may be formed while a board portion 4 is disposed at an elevated temperature TE. Moreover, it is clear that the processing device 13 in, e.g., FIGS. 1*a*-1*b* may be replaced by a carving tool 13*b* or a drilling/milling tool 13*c* as described in relation to FIGS. 3*a*-3*b* and 6*a*-6*b*, respectively. Finally, in some embodiments, the layer 31 described in relation to, e.g., FIG. 6*e*, as a core, may instead be a balancing layer sandwiched between an upper 32 and a lower 33 arrangement in complete analogy with the disclosure WO 2021/133242 A1.

EMBODIMENTS

Item 1. A method for forming at least one groove (3) in a board element (1; 1'), said board element comprising a polymer-based material and, preferably, a filler, the method comprising:

providing a board element comprising a board portion (4) disposed at an elevated temperature (TE), and, preferably then, forming said at least one groove by removing material (4'), such as chips, from the board portion (4), preferably disposed at an elevated temperature (TE), by a processing device (13).

Item 2. The method according to item 1, further comprising elevating a temperature of the board portion (4) from an initial temperature (TO) to said elevated temperature (TE).

Item 3. The method according to item 1 or 2, wherein said elevated temperature (TE) is obtained by heating the board portion (4).

Item 4. The method according to item 1 or 2, wherein said elevated temperature (TE) is obtained during forming of the board element under heat and, preferably, pressure.

Item 5. The method according to any of the preceding items, wherein the groove(s) is/are formed after a forming of the board element while said board portion (4) is disposed at the elevated temperature (TE).

Item 6. The method according to any of the preceding items, further comprising forming the board element (1; 1') under heat, preferably by (co-)extrusion and/or under pressure.

Item 7. The method according to any of the preceding items, wherein the board portion (4) is provided at least in a rear side (5) of the board element.

Item 8. The method according to any of the preceding items, wherein the board portion (4) comprises a thermoplastic material and, preferably, a filler.

Item 9. The method according to any of the preceding items, wherein the elevated temperature (TE) exceeds 25° C., preferably exceeding 40° C. or exceeding 60° C.

Item 10. The method according to any of the preceding items, wherein the elevated temperature (TE) is 30-150° C., such as 35-90° C. or preferably 40-70° C.

Item 11. The method according to any of the preceding items, further comprising displacing the board element in a feeding direction (F), preferably during said forming of the groove(s).

Item 12. The method according to any of the preceding items, wherein the processing device (13) comprises a rotational cutting device (13*a*).

Item 13. The method according to any of the preceding items, further comprising dividing said board element (1') into at least two panels (1), preferably while the board element is provided above an initial temperature (TO) and/or an ambient temperature (TA).

Item 14. The method according to any of the preceding items, further comprising forming a locking device (9) on at least one edge portion (1*a*, 1*b*; 1*c*, 1*d*) of the board element in the form of a panel (1) or of at least two panels (1) into which the board element has been divided, preferably on two opposite edge portions thereof.

Item 15. The method according to any of the preceding items, wherein the board element (1') is provided in the form of a panel (1) or is dividable into at least two panels (1), each panel being a building panel, floor panel, wall panel, ceiling panel or furniture panel.

Item 16. An arrangement (10) for forming grooves (3) in a board element (1; 1'), comprising:

a board heating device (20), and a processing device (13).

Item 17. The arrangement according to item 16, further comprising a board forming arrangement (20').

Item 18. The arrangement according to item 17, wherein the board forming arrangement (20') comprises an extruder (22) and, preferably, a roller arrangement (23).

Item 19. The arrangement according to item 17 or 18, wherein the board heating device (20) is provided in the board forming arrangement (20').

Item 20. The arrangement according to any of the preceding items 16-18, wherein the board heating device (20) is a separate heating device (25).

Item 21. The arrangement according to any of the preceding items 17-20, wherein the board forming arrangement (20') comprises a pressing device, such as a double-belt press (20*a'*), rollers, or a static press (20*b'*).

Item 22. The arrangement according to any of the preceding items 16-21, wherein the processing device (13) comprises or is a rotational cutting device (13*a*).

Item 23. The arrangement according to any of the preceding items 16-22, wherein the processing device (13) comprises a first (13*a*) and a second (13*a'*) rotating cutting device.

Item 24. The arrangement according to any of the preceding items 16-23, further comprising a board dividing device (12) configured to divide the board element (1') into at least two panels (1).

The invention claimed is:

1. A method for forming at least one groove in a board element, said board element comprising a thermoplastic material, wherein the board element is provided in a form of a panel or is dividable into at least two panels, each panel being a floor panel or a wall panel, the method comprising:

forming the board element under heat, providing the board element comprising a board portion disposed at an elevated temperature, said elevated temperature being obtained during said forming of the board element under heat, wherein said board portion comprises the thermoplastic material, wherein the elevated temperature exceeds 25° C., and forming said at least one groove by removing material from the board portion disposed at the elevated temperature by a processing device, wherein the removing of the material from the board portion includes cutting or chipping the material away from the board element when the board portion is disposed at the elevated temperature, and wherein the forming of the at least one groove forms a groove bottom recessed from a face of the board portion and at least two opposing lateral walls of the groove extending from the face of the board portion to the groove bottom.

2. The method according to claim 1, wherein the at least one groove is formed after the forming of the board element while said board portion is disposed at the elevated temperature.

3. The method according to claim 1, wherein the board element is further formed under pressure.

4. The method according to claim 1, wherein the board element is formed by extrusion or coextrusion.

5. The method according to claim 1, wherein the board portion is provided at least in a rear side of the board element.

6. The method according to claim 1, wherein the elevated temperature exceeds 40° C.

7. The method according to claim 1, wherein the elevated temperature is 30-150° C.

8. The method according to claim 1, wherein the elevated temperature is 35-90° C.

9. The method according to claim 1, further comprising displacing the board element in a feeding direction during said forming of the at least one groove.

10. The method according to claim 1, wherein the processing device comprises a rotational cutting device.

11. The method according to claim 1, further comprising dividing said board element into said at least two panels while the board element is provided above an ambient temperature.

12. The method according to claim 1, further comprising forming a locking device on at least one edge portion of the board element in the form of a panel or of at least two panels into which the board element has been divided.

13. The method according to claim 1, wherein the cutting or chipping of the material away from the board element is performed using at least one selected from: a rotational cutting device, a carving tool, a milling tool, and a drilling tool.

* * * * *